(12) United States Patent
Xie et al.

(10) Patent No.: US 10,657,964 B2
(45) Date of Patent: May 19, 2020

(54) METHOD FOR CONTROLLING SMART DEVICE, COMPUTER DEVICE AND STORAGE MEDIUM

(71) Applicant: BAIDU ONLINE NETWORK TECHNOLOGY (BEIJING) CO., LTD., Beijing (CN)

(72) Inventors: Bo Xie, Beijing (CN); Yang Sun, Beijing (CN); Yan Xie, Beijing (CN); Sheng Qian, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 0 days.

(21) Appl. No.: 16/045,877

(22) Filed: Jul. 26, 2018

(65) Prior Publication Data

US 2019/0057695 A1    Feb. 21, 2019

(30) Foreign Application Priority Data

Aug. 21, 2017 (CN) .......................... 2017 1 0718772

(51) Int. Cl.
| | | |
|---|---|---|
| G10L 15/00 | (2013.01) | |
| G10L 15/22 | (2006.01) | |
| G06F 3/16 | (2006.01) | |
| G10L 15/08 | (2006.01) | |
| G10L 15/30 | (2013.01) | |

(52) U.S. Cl.
CPC ............ *G10L 15/22* (2013.01); *G06F 3/167* (2013.01); *G10L 15/08* (2013.01); *G10L 15/30* (2013.01); *G10L 2015/088* (2013.01); *G10L 2015/223* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,505,910 B2 * | 3/2009 | Kujirai | ............... | G01C 21/3608 704/270.1 |
| 8,938,394 B1 * | 1/2015 | Faaborg | .................. | G06F 3/167 704/275 |
| 2015/0255070 A1 * | 9/2015 | Schuckle | ................ | G10L 15/08 704/275 |
| 2018/0082682 A1 * | 3/2018 | Erickson | ................. | G10L 15/22 |

FOREIGN PATENT DOCUMENTS

CN        106030506        10/2016

OTHER PUBLICATIONS

CNIPA, Office Action for CN Application No. 201710718772.2, dated Mar. 5, 2020.

* cited by examiner

*Primary Examiner* — Vu B Hang
(74) *Attorney, Agent, or Firm* — Hodgson Russ LLP

(57) ABSTRACT

Embodiments of the present disclosure provide a method for controlling a smart device, a computer device and a non-transitory computer readable storage medium. The method includes performing speech recognition on a speech signal acquired by the smart device; determining whether a control instruction corresponding to the speech signal matches with a present operation scene of the smart device; and adjusting an operation state of the smart device according to the control instruction when the control instruction matches with the present operation scene.

13 Claims, 2 Drawing Sheets

METHOD FOR CONTROLLING SMART DEVICE, COMPUTER DEVICE AND STORAGE MEDIUM

CROSS-REFERENCE TO RELATED APPLICATIONS

This application is based on and claims priority of Chinese Patent Application No. 201710718772.2, filed on Aug. 21, 2017, the entire contents of which are incorporated herein by reference.

TECHNICAL FIELD

The present disclosure relates to a field of managing smart devices, and more particularly relates to a method for controlling a smart device, a computer device and a non-transitory computer readable storage medium.

BACKGROUND

At present, with development of science and technology and improvement of living standard, smart devices such as smart loudspeaker boxes, smart wearable devices are wildly used in living, study and work.

In prior art, when the smart device is controlled, a wake-up word is required to wake up the smart device, and the smart device is controlled by a control instruction. However, in this way, the operations are complex and user experience is bad.

SUMMARY

The present disclosure aims to solve at least one of the aforementioned problems in the prior art to at least some extent.

Accordingly, embodiments of the present disclosure provide a method for controlling a smart device.

Embodiments of the present disclosure further provide an apparatus for controlling a smart device.

Embodiments of the present disclosure further provide a computer device.

Embodiments of the present disclosure further provide a computer readable storage medium.

A first aspect of embodiments of the present disclosure provides a method for controlling a smart device. The method including performing speech recognition on a speech signal acquired by the smart device; determining whether a control instruction corresponding to the speech signal matches with a present operation scene of the smart device; and adjusting an operation state of the smart device according to the control instruction when the control instruction matches with the present operation scene.

A second aspect of embodiments of the present disclosure provides an apparatus for controlling a smart device. The apparatus includes: a first judging module, configured to perform speech recognition on a speech signal acquired by the smart device and to determine whether a control instruction corresponding to the speech signal matches with a present operation scene of the smart device; and a first adjusting module, configured to adjust an operation state of the smart device according to the control instruction when the control instruction matches with the present operation scene.

A third aspect of embodiments of the present disclosure provides a computer device. The computer device includes: a processor, a memory having computer programs stored thereon and executable by the processor, wherein when the programs are configured to be executed by the processor, the method according to the first aspect of the embodiments is performed.

A fourth aspect of embodiments of the present disclosure provides a computer readable storage medium having computer programs, that when executed by a processor, cause the processor to perform the method according to the first aspect of embodiments of the present disclosure.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
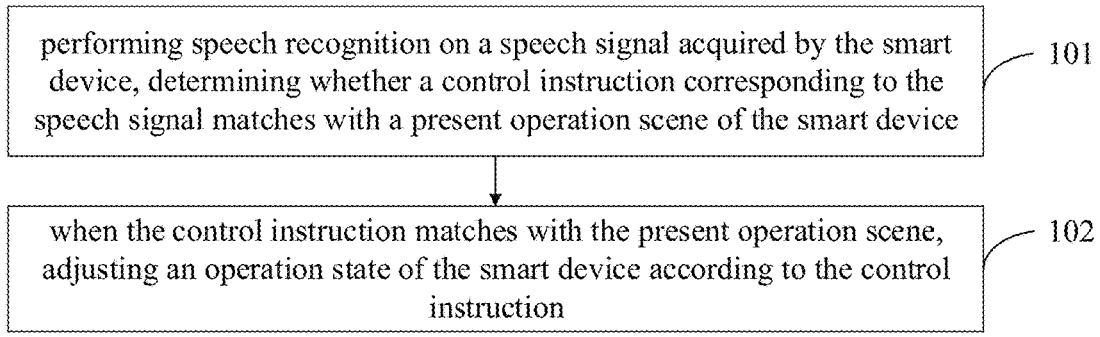
FIG. 1 is a flow chart illustrating a method for controlling a smart device according to an embodiment of the present disclosure.

Reference will be made in detail to embodiments of the present disclosure. The embodiments shall not be construed to limit the present disclosure. The same or similar elements and the elements having same or similar functions are denoted by like reference numerals throughout the descriptions. The embodiments described herein with reference to drawings are explanatory, illustrative, and used to generally understand the present disclosure.

In the prior art, when control of the smart device is desired, a wake-up word is required to wake up a smart device and then the smart device is controlled according to a control instruction, which brings complex operations and bad user experience. In order to solve the problems in the prior art, embodiments of the present disclosure provide a method for controlling a smart device.

With the method for controlling a smart device according to embodiments of the present disclosure, after the speech recognition is performed on the speech signal acquired by the smart device, when the control instruction corresponding to the speech signal matches with the present operation scene of the smart device, the operation state of the smart device is adjusted according to the control instruction. In this way, the smart device can be controlled according to the control instruction matching with the present operation scene without any wake-up words, such that the control method is simple and flexibility of the control method is improved, thus improving the user experience.

A method for controlling a smart device, an apparatus for controlling a smart device and a computer device according to embodiments of the present disclosure will be described in detail hereinafter with reference to accompanying drawings.

FIG. 1 is a flow chart illustrating a method for controlling a smart device according to an embodiment of the present disclosure.

As illustrated in FIG. 1, the method may include the followings.

At block 101, speech recognition is performed on a speech signal acquired by the smart device, it is determined whether a control instruction corresponding to the speech signal matches with a present operation scene of the smart device.

At block 102, when the control instruction matches with the present operation scene, an operation state of the smart device is adjusted according to the control instruction.

The method for controlling the smart device according to the embodiments of the present disclosure can be executed by an apparatus for controlling the smart device according to embodiments of the present disclosure. The apparatus for controlling the smart device can be disposed in a smart device such as a loudspeaker box, a phone, a computer, or can be disposed in a server for controlling the smart device such as the loudspeaker box, so as to control the smart device.

In detail, a speech input means such as microphone can be provided in the smart device in advance, such that when the user controls the smart device via speech, the smart device can acquire the speech signal via the speech input means.

Additionally, a speech recognition module can be provided in the apparatus for controlling the smart device, such that after the smart device acquires the speech signal, the speech recognition module can be used to perform speech recognition on the speech signal, so as to acquire the control instruction corresponding to the speech signal.

It can be understood that, before determining whether the control instruction corresponding to the speech signal matches with the present operation scene of the smart device, the present operation scene is determined. Before the block 101, the method may further include: determining the present operation scene and acquiring a set of control instructions matching with the present operation scene.

In detail, a mapping relation between the operation scenes of the smart device and sets of control instructions can be preset, such that after the present operation scene of the smart device is determined, the set of control instructions matching with the present operation scene can be acquired according to the preset mapping relation. Then it is determined whether the acquired control instruction is contained in the set of control instructions matching with the present operation scene, if yes, the operation state of the smart device can be adjusted according to the acquired control instruction, if no, the control instruction is discarded and no adjustment on the operation state of the smart device is performed.

For example, when the operation scene of the smart device is playing music, the corresponding set of control instructions which is set in advance includes control striations such as "next", "last", "turn down the volume", "pause", "change another song", "hot songs" or the like. When the operation scene of the smart device is playing music, the corresponding set of control instructions includes control instructions such as "financial report", "evening news". "morning news", "Beijing News", "overseas news" or the like. Then, assuming that the present operation scene of the smart device is playing music, when the control instruction corresponding to the speech signal acquired by the smart device is "pause" which is contained in the set of control instructions corresponding to the scene of playing music, the playing of music in the smart device can be paused according to the control instruction "pause"; when the control instruction corresponding to the speech signal acquired by the smart device is "morning news" which is not contained in the set of control instructions corresponding to the scene of playing music, the control instruction is discarded and the operation state of the smart device is not adjusted.

It can be understood that, in prior art, when the control of the smart device is desired, the wake-up word is required to wake up the smart device and then the smart device is controlled according to the control instruction. For example, the preset wake-up word may be "xiaodu", the user needs to pronounce "xiaodu" first and then pronounces the control instruction such as "last", "morning news" or the like, so as to control the smart device. However, with the method provided in the embodiments of the present disclosure, the user needs not to pronounce "xiaodu" or any other wake-up words, and controls the smart device according to the control instruction matching with the present operation scene, which is easy to implement and improves the flexibility, thus improving the user experience.

It should be noted that, in practice, when the control instruction corresponding to the speech signal does not match with the present operation scene of the smart device, the present operation scene of the smart device may be not influenced by performing the control instruction. For example, when the smart device is playing music, if the control instruction "setting an alarm clock at 3 o'clock pm", the alarm clock can be set in background, which does not influence the playing of music.

Accordingly, in an implementation of the present disclosure, when the control instruction corresponding to the speech signal does not match with the present operation scene of the smart device, it is determined whether to perform the control instruction according to demands.

After the block 101, the method may further include: when the control instruction corresponding to the speech signal does not match with the present operation scene of the smart device, determining whether the control instruction collides with the present operation scene of the smart device, if yes discarding the control instruction, if no performing the control instruction.

In detail, it can be determined whether the control instruction collides with the present operation scene of the smart device in many ways.

For example, it can be determined whether the control instruction needs to be performed in background or foreground, when the control instruction needs to be performed in the foreground, it can be determined that the control instruction collides with the present operation scene of the smart device, and the control instruction is discarded. When the control instruction needs to be performed in the background, it can be determined that the control instruction does not collide with the present operation scene of the smart device, and the control instruction is performed.

In another embodiment, it can be determined whether resource to be occupied by the control instruction is the same as resource occupied in the present operation scene, if yes, it can be determined that the control instruction collides with the present operation scene of the smart device, and the control instruction is discarded, if no, it can be determined that the control instruction does not collide with the present operation scene of the smart device, and the control instruction is performed.

For example, when the operation scene of the smart device is playing music, the corresponding set of control instructions which is set in advance includes control striations such as "next", "last", "turn down the volume", "pause", "change another song", "hot songs" or the like. When the operation scene of the smart device is playing music, the corresponding set of control instructions includes control instructions such as "financial report", "evening news", "morning news", "Beijing News", "overseas news" or the like.

Assuming that the smart device is playing music, when the control instruction "morning news" is acquired, it can be determined that the control instruction "morning news" collides with the present operation scene of the smart device and the control instruction is discarded since the control instruction "morning news" does not match with the present operation scene and both operations of broadcasting the morning news and playing the music occupy a speaker of the smart device; when the control instruction "setting an alarm clock at 3 o'clock pm" is acquired, although the control instruction "setting an alarm clock at 3 o'clock pm" does not match with the present operation scene, the setting of the alarm clock can be performed in background without influencing the playing of music, such that the control instruction "setting an alarm clock at 3 o'clock pm" does not collide with the present operation scene of the smart device and the control instruction is performed.

With the method for controlling a smart device according to embodiments of the present disclosure, after the speech recognition is performed on the speech signal acquired by the smart device, when the control instruction corresponding to the speech signal matches with the present operation scene of the smart device, the operation state of the smart device is adjusted according to the control instruction. In this way, the smart device can be controlled according to the control instruction matching with the present operation scene without any wake-up words, such that the control method is simple and flexibility of the control method is improved, thus improving the user experience.

In summary, after the speech recognition is performed on the speech signal acquired by the smart device, when the control instruction corresponding to the speech signal matches with the present operation scene of the smart device, the smart device can be controlled without a wake-up word. In practice, the smart device can be controlled according to whether the preset key word is contained in the speech signal, which can be described in detail with reference to FIG. 2.

Figure 2:
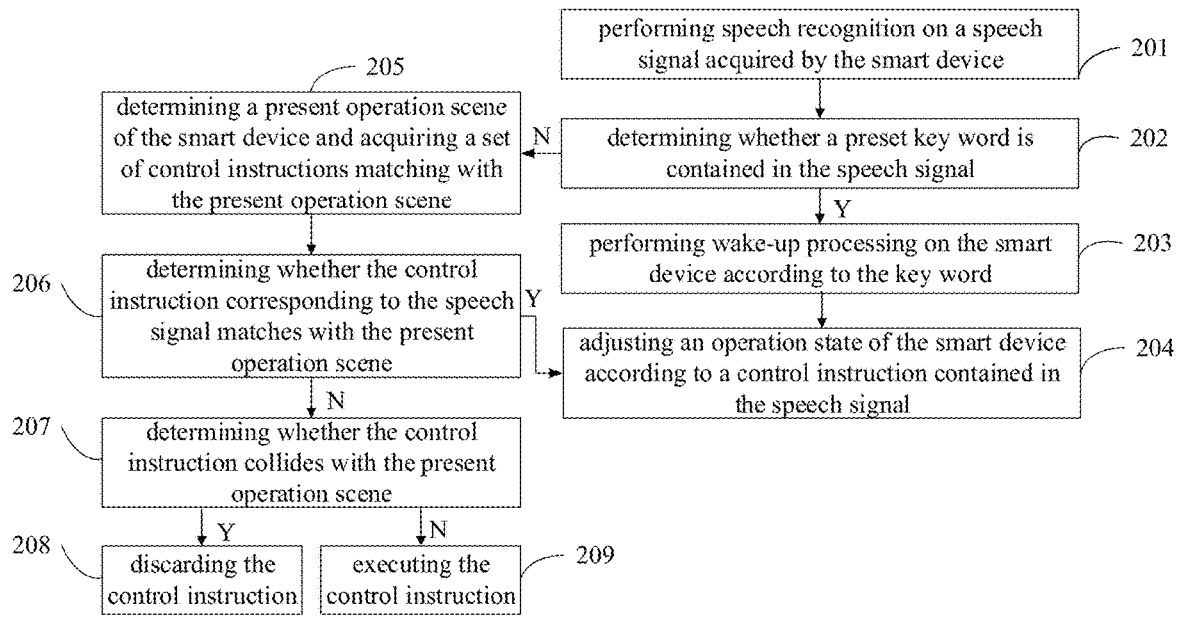
FIG. 2 is a flow chart illustrating a method for controlling a smart device according to another embodiment of the present disclosure.

FIG. 2 is a flow chart illustrating a method for controlling a smart device according to another embodiment of the present disclosure.

As illustrated in FIG. 2, the method may include the followings.

At block 201, speech recognition is performed on a speech signal acquired by the smart device.

Regarding the implementation and principle of block 201, reference can be made to description of block 101 in the above embodiment, which is not described herein.

At block 202, it is determined whether a preset key word is contained in the speech signal, if yes, the act at block 203 is executed, if no, the act at block 205 is executed.

At block 203, wake-up processing is performed on the smart device according to the key word.

At block 204, an operation state of the smart device is adjusted according to a control instruction contained in the speech signal.

In detail, the key word for waking up the smart device can be set in advance. If the speech signal contains the preset key word, the wake-up processing is performed on the smart device, and the operation state of the smart device is adjusted according to the control instruction contained in the speech signal.

There may be a plurality of preset key words, or may be one preset key word, which is not limited herein.

In an implementation, when the speech signal contains any of the preset key words, the wake-up processing is performed on the smart device, such that the operation state of the smart device can be adjusted according to the control instruction in the speech signal.

It should be noted that, in a possible implementation, after the wake-up processing is performed on the smart device according to the key word, if the speech signal containing the control instruction is not acquired, or the time period from when the speech signal containing the preset key word is acquired to when the speech signal containing the control instruction is too long, then the smart device is in the wake-up state for a long while, which may waste power.

In an embodiment of the present disclosure, the time period during which the smart device is in the wake-up state after being waken up is set as T in advance. After the smart device is waken up according to the key word contained in the speech signal, the smart device can be controlled to be in the wake-up state for the time period T. When the speech signal containing the control instruction is acquired during the time period T, the operation state of the smart device is adjusted according to the control instruction. When no speech signal containing the control instruction is acquired during the time period T, the smart device is controlled to enter an unawake state such as a dormant mode or a power saving mode, and when the smart device needs to be controlled, it is determined again whether the acquired speech signal contains the preset key word, so as to wake up the smart device again. In this way, the power consumption can be reduced.

For example, assuming that the preset key word for waking up the smart device is "xiaodu", "xiao A", and that the time period during which the smart device remains in the wake-up state after the smart device is waken up is one minute. When it is determined that the speech signal contains "xiaodu" after the speech recognition is performed on the speech signal acquired by the smart device, the wake-up processing is performed on the smart device. Then, if the control instruction "morning news" is acquired in one minute, the smart device is controlled to broadcast the morning news, if no control instruction is acquired in one minute, the smart device is controlled to enter the dormant state.

At block 205, a present operation scene of the smart device is determined, and a set of control instructions matching with the present operation scene is acquired.

At block 206, it is determined whether the control instruction corresponding to the speech signal matches with the present operation scene, if yes, the act at block 204 is performed, if no, the act at block 207 is performed.

At block 207, it is determined whether the control instruction collides with the present operation scene, if yes the act at block 208 is performed, if no, the act at block 209 is performed.

At block 208, the control instruction is discarded.

At block 209, the control instruction is executed.

Regarding the implementation and principle of blocks 204-209, reference can be made to description of blocks 101-102 in the above embodiment, which is not described herein.

With the method for controlling a smart device according to embodiments of the present disclosure, after the speech recognition is performed on the speech signal acquired by the smart device, it is determined whether the speech signal contains the preset key word, if yes, the wake-up processing is performed on the smart device according to the smart device and the operation state of the smart device is adjusted according to the control instruction contained in the speech signal, if no, the operation state of the smart device is controlled according to whether the control instruction corresponding to the speech signal matches with the present operation scene of the smart device and whether the control instruction collides with the present operation scene. In this way, the smart device can be controlled according to whether the speech signal contains the preset key word, such that the control method is simple and flexibility of the control method is improved, thus improving the user experience.

Figure 3:
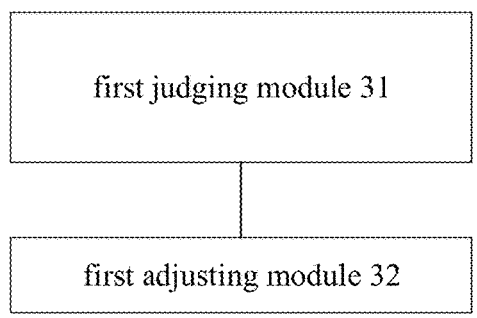
FIG. 3 is a block diagram of an apparatus for controlling a smart device according to an embodiment of the present disclosure.

FIG. 3 is a block diagram of an apparatus for controlling a smart device according to an embodiment of the present disclosure.

As illustrated in FIG. 3, the apparatus may include a first judging module 31 and a first adjusting module 32.

The first judging module 31 is configured to perform speech recognition on a speech signal acquired by the smart device and to determine whether a control instruction corresponding to the speech signal matches with a present operation scene of the smart device.

The first adjusting module 32 is configured to adjust an operation state of the smart device according to the control instruction when the control instruction matches with the present operation scene.

The method for controlling the smart device according to the embodiments of the present disclosure can be executed by an apparatus for controlling the smart device according to embodiments of the present disclosure. The apparatus for controlling the smart device can be disposed in a smart device such as a loudspeaker box, a phone, a computer, or can be disposed in a server for controlling the smart device such as the loudspeaker box, so as to control the smart device.

It should be noted that, the aforementioned description of embodiments of the method for controlling the smart device is also suitable to explain the apparatus for controlling the smart device, which is not descripted herein.

With the apparatus for controlling a smart device according to embodiments of the present disclosure, after the speech recognition is performed on the speech signal acquired by the smart device, when the control instruction corresponding to the speech signal matches with the present operation scene of the smart device, the operation state of the smart device is adjusted according to the control instruction. In this way, the smart device can be controlled according to the control instruction matching with the present operation scene without any wake-up words, such that the control method is simple and flexibility of the control method is improved, thus improving the user experience.

Figure 4:
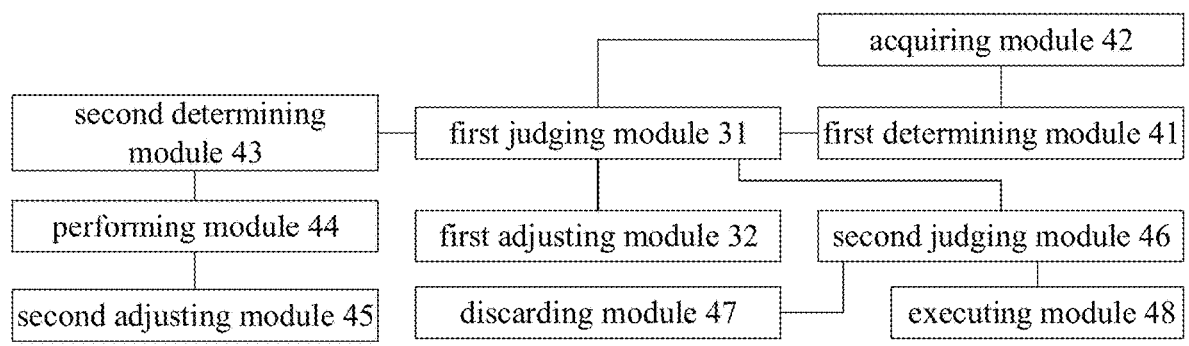
FIG. 4 is a block diagram of an apparatus for controlling a smart device according to another embodiment of the present disclosure.

FIG. 4 is a block diagram of an apparatus for controlling a smart device according to another embodiment of the present disclosure.

As illustrated in FIG. 4, based on the embodiment in FIG. 3, the apparatus may further include a first determining module 41, an acquiring module 42, a second determining module 43, a performing module 44, a second adjusting module 45, a second judging module 46, a discarding module 47 and an executing module 48.

The first determining module 41 is configured to determine the present operation scene of the smart device.

The acquiring module 42 is configured to acquire a set of control instructions matching with the present operation scene.

The second determining module 43 is configured to determine that the speech signal does not contain a preset key word.

The performing module 44 is configured to perform wake-up processing on the smart device according to a preset key word in response to determining that the speech signal contains the preset key word.

The second adjusting module 45 is configured to adjust the operation state of the smart device according to a control instruction contained in the speech signal.

The second judging module 46 is configured to determine whether the control instruction collides with the present operation scene when the control instruction does not match with the present operation scene.

The discarding module 47 is configured to discard the control instruction when the control instruction collides with the present operation scene.

The executing module 48 is configured to execute the control instruction when the control instruction does not collide with the present operation scene.

It should be noted that, the aforementioned description of embodiments of the method for controlling the smart device is also suitable to explain the apparatus for controlling the smart device, which is not descripted herein.

With the apparatus for controlling a smart device according to embodiments of the present disclosure, after the speech recognition is performed on the speech signal acquired by the smart device, when the control instruction corresponding to the speech signal matches with the present operation scene of the smart device, the operation state of the smart device is adjusted according to the control instruction. In this way, the smart device can be controlled according to the control instruction matching with the present operation scene without any wake-up words, such that the control method is simple and flexibility of the control method is improved, thus improving the user experience.

Embodiments of the present disclosure provide a computer device. The computer device includes: a processor, a memory having computer programs stored thereon and executable by the processor, when the programs are configured to be executed by the processor, the method described above is performed.

Embodiments of the present disclosure provide a computer readable storage medium having computer programs, that when executed by a processor, cause the processor to perform the method described above.

Embodiments of the present disclosure provide a computer program product, when instructions in the computer program product are executed by a processor, the processor is caused to perform the method described above.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

In addition, terms such as "first" and "second" are used herein for purposes of description and are not intended to indicate or imply relative importance or significance. Thus, the feature defined with "first" and "second" may comprise one or more this feature. In the description of the present disclosure, "a plurality of" means two or more than two, unless specified otherwise.

It will be understood that, the flow chart or any process or method described herein in other manners may represent a module, segment, or portion of code that comprises one or more executable instructions to implement the specified logic function(s) or that comprises one or more executable instructions of the steps of the progress. Although the flow chart shows a specific order of execution, it is understood that the order of execution may differ from that which is depicted. For example, the order of execution of two or more boxes may be scrambled relative to the order shown.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks, CD, etc. It should be noted that, although the present disclosure has been described with reference to the embodiments, it will be appreciated by those skilled in the art that the disclosure includes other examples that occur to those skilled in the art to execute the disclosure. Therefore, the present disclosure is not limited to the embodiments.

What is claimed is:

1. A method for controlling a smart device, comprising:
   performing speech recognition on a speech signal acquired by the smart device;
   determining whether a control instruction corresponding to the speech signal matches with a present operation scene of the smart device; and
   adjusting an operation state of the smart device according to the control instruction when the control instruction matches with the present operation scene;
   after determining whether the control instruction corresponding to the speech signal matches with the present operation scene of the smart device, further comprising:
      determining whether the control instruction collides with the present operation scene when the control instruction does not match with the present operation scene;
      discarding the control instruction when the control instruction collides with the present operation scene; and
      executing the control instruction when the control instruction does not collide with the present operation scene;
   wherein determining whether the control instruction corresponding to the speech signal matches with the present operation scene of the smart device comprises:
      determining whether the control instruction corresponding to the speech signal matches with the present operation scene of the smart device in response to determining that the speech signal does not contain a preset wake-up word;
   wherein determining whether the control instruction collides with the present operation scene comprises:
      determining whether the control instruction needs to be executed in background or foreground;
      determining that the control instruction collides with the present operation scene in response to determining that the control instruction needs to be executed in the foreground; and determining that the control instruction does not collide with the present operation scene in response to determining that the control instruction needs to be executed in the background.

2. The method according to claim 1, before determining whether the control instruction corresponding to the speech signal matches with the present operation scene of the smart device, further comprising:
   determining the present operation scene of the smart device; and
   acquiring a set of control instructions matching with the present operation scene.

3. The method according to claim 2, wherein acquiring the set of control instructions matching with the present operation scene comprises:
   acquiring the set of control instructions matching with the present operation scene according to a predetermined mapping relation between operation scenes and sets of control instructions.

4. The method according to claim 1, after performing the speech recognition on the speech signal acquired by the smart device, further comprising:
   performing wake-up processing on the smart device according to a preset key word in response to determining that the speech signal contains the preset key word.

5. The method according to claim 4, after performing the wake-up processing on the smart device, further comprising:
   adjusting the operation state of the smart device according to the control instruction contained in the speech signal.

6. The method according to claim 4, after performing the wake-up processing on the smart device, further comprising:
   controlling the smart device to enter an unawaken state when the speech signal does not contains the control instruction and the speech signal containing the control instruction is not received within a preset time period.

7. A computer device, comprising a processor, a memory having computer programs stored thereon and executable by the processor, wherein when the programs are configured to be executed by the processor, the processor is configured to perform the method comprising:
   performing speech recognition on a speech signal acquired by the smart device;
   determining whether a control instruction corresponding to the speech signal matches with a present operation scene of the smart device; and
   adjusting an operation state of the smart device according to the control instruction when the control instruction matches with the present operation scene;
   after determining whether the control instruction corresponding to the speech signal matches with the present operation scene of the smart device:
      determining whether the control instruction collides with the present operation scene when the control instruction does not match with the present operation scene;
      discarding the control instruction when the control instruction collides with the present operation scene; and
      executing the control instruction when the control instruction does not collide with the present operation scene;
   wherein determining whether the control instruction corresponding to the speech signal matches with the present operation scene of the smart device comprises:
      determining whether the control instruction corresponding to the speech signal matches with the present operation scene of the smart device in response to determining that the speech signal does not contain a preset wake-up word;
   wherein determining whether the control instruction collides with the present operation scene comprises:
      determining whether the control instruction needs to be executed in background or foreground;
      determining that the control instruction collides with the present operation scene in response to determining that the control instruction needs to be executed in the foreground; and
      determining that the control instruction does not collide with the present operation scene in response to determining that the control instruction needs to be executed in the background.

8. The computer device according to claim 7, before determining whether the control instruction corresponding to the speech signal matches with the present operation scene of the smart device, further comprising:
   determining the present operation scene of the smart device; and
   acquiring a set of control instructions matching with the present operation scene.

9. The computer device according to claim 8, wherein acquiring the set of control instructions matching with the present operation scene comprises:
   acquiring the set of control instructions matching with the present operation scene according to a predetermined mapping relation between operation scenes and sets of control instructions.

10. The computer device according to claim 7, after performing the speech recognition on the speech signal acquired by the smart device, further comprising:
    performing wake-up processing on the smart device according to a preset key word in response to determining that the speech signal contains the preset key word.

11. The computer device according to claim 10, after performing the wake-up processing on the smart device, further comprising:
    adjusting the operation state of the smart device according to the control instruction contained in the speech signal.

12. The computer device according to claim 10, after performing the wake-up processing on the smart device, further comprising:
    controlling the smart device to enter an unawaken state when the speech signal does not contains the control instruction and the speech signal containing the control instruction is not received within a preset time period.

13. A non-transitory computer readable storage medium having computer programs, that when executed by a processor, cause the processor to perform the method comprising:
    performing speech recognition on a speech signal acquired by the smart device;
    determining whether a control instruction corresponding to the speech signal matches with a present operation scene of the smart device; and
    adjusting an operation state of the smart device according to the control instruction when the control instruction matches with the present operation scene;
    after determining whether the control instruction corresponding to the speech signal matches with the present operation scene of the smart device:

determining whether the control instruction collides with the present operation scene when the control instruction does not match with the present operation scene;

discarding the control instruction when the control instruction collides with the present operation scene; and executing the control instruction when the control instruction does not collide with the present operation scene;

wherein determining whether the control instruction corresponding to the speech signal matches with the present operation scene of the smart device comprises:

determining whether the control instruction corresponding to the speech signal matches with the present operation scene of the smart device in response to determining that the speech signal does not contain a preset wake-up word;

wherein determining whether the control instruction collides with the present operation scene comprises:

determining whether the control instruction needs to be executed in background or foreground;

determining that the control instruction collides with the present operation scene in response to determining that the control instruction needs to be executed in the foreground; and determining that the control instruction does not collide with the present operation scene in response to determining that the control instruction needs to be executed in the background.

\* \* \* \* \*